(12) United States Patent
Bonta

(10) Patent No.: US 7,409,218 B2
(45) Date of Patent: Aug. 5, 2008

(54) CELLULAR AD HOC PHONE EXTENSION SYSTEM AND METHOD

(75) Inventor: Jeffrey D. Bonta, Arlington Heights, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/159,663

(22) Filed: May 31, 2002

(65) Prior Publication Data

US 2003/0224808 A1   Dec. 4, 2003

(51) Int. Cl.
*H04Q 7/20* (2006.01)

(52) U.S. Cl. .................. 455/453; 455/462; 455/464; 455/465; 455/450; 379/70; 379/88.26; 379/171; 379/211.01; 379/212.01

(58) Field of Classification Search .......... 455/403, 455/552.1, 462, 463, 41.3, 416, 15, 422.1, 455/465, 450, 455, 464, 462.1, 453; 375/134, 375/70, 88.26, 171, 211.01, 212.01
See application file for complete search history.

(56) References Cited

U.S. PATENT DOCUMENTS

| | | | |
|---|---|---|---|
| 5,528,666 A | 6/1996 | Weigand et al. | |
| 6,128,504 A * | 10/2000 | Ciccone | 455/464 |
| 6,351,653 B1 * | 2/2002 | Alberth et al. | 455/552.1 |
| 6,405,027 B1 * | 6/2002 | Bell | 455/403 |
| 6,519,454 B1 * | 2/2003 | Calabrese et al. | 455/432.1 |
| 6,549,783 B1 * | 4/2003 | Touzeau et al. | 455/463 |
| 6,633,759 B1 * | 10/2003 | Kobayashi | 455/419 |
| 6,650,629 B1 * | 11/2003 | Takahashi et al. | 370/335 |
| 6,873,839 B2 * | 3/2005 | Stanforth | 455/343.2 |
| 6,912,384 B2 * | 6/2005 | Huomo et al. | 455/417 |
| 2001/0044314 A1 * | 11/2001 | Vilhelm Martensson et al. | 455/462 |

* cited by examiner

*Primary Examiner*—Nghi H Ly

(57) ABSTRACT

A method of establishing a cooperative ad hoc network of phone extensions is implemented by the cellular devices within the ad hoc network. First, a first cellular device receiving an incoming call or placing an outgoing call is designated as the master of the ad hoc network and the remaining cellular devices are designated as slaves of the ad hoc network. Second, each cellular device is operated to facilitate a multi-party connection to the incoming call or outgoing call, the multi-party connection including the master and one or more slaves.

8 Claims, 4 Drawing Sheets

CELLULAR AD HOC PHONE EXTENSION SYSTEM AND METHOD

FIELD OF THE INVENTION

The present invention generally relates to methods for establishing a cellular ad hoc network. More specifically, the present invention relates to an establishment of cooperative ad hoc network of cellular devices.

BACKGROUND OF THE INVENTION

Currently, a cordless phone within a home offers freedom of movements for a user by being physically unattached to a phone jack. Multiple cordless phones and associated base stations can be strategically positioned throughout a home as along as the base stations are plugged into wire-line jacks that serve the home. This provides the convenience of having multiple phone extensions corresponding to a single phone number whereby a call can be answered in one of various locations within the home and multiple users can share in on an answered call in progress. However, with families or roommates within a home having a single phone number, each cordless phone can only be part of an incoming call that is answered or an outgoing call that is placed.

The present invention advances the art by providing a method for establishing a cooperative ad hoc network of cellular devices to form a multi-party connection for sharing conversation and call control.

SUMMARY OF THE INVENTION

One form of the present invention is a first method of operating an ad hoc network of cellular devices. First, a first cellular device receiving an incoming call or placing an outgoing call is designated as the master of the ad hoc network, and a second cellular device is designated as a slave of the ad hoc network. Second, each cellular device is operable to facilitate a multi-party connection to the incoming call or the outgoing call upon an answering of the incoming call or the outgoing call, wherein the second cellular device is operable to answer the incoming call. The multi-party connection includes the master and the slave.

A second form of the invention is a second method of operating an ad hoc network of cellular devices. First, a first cellular device receiving an incoming call is designated as the master of the ad hoc network and a second cellular device is designated as a slave of the ad hoc network. Second, the second cellular device is activated to indicate a reception of the incoming call by the first cellular device, wherein the second cellular device is operable to answer the incoming call.

A third form a third method of operating an ad hoc network of cellular devices. First, a first cellular device placing an outgoing call is designated as the master of the ad hoc network and a second cellular device is designated as a slave of the ad hoc network. Second, the first cellular device establishes a dedicated connection to the outgoing call for the second cellular device.

The foregoing forms and other forms as well as features and advantages of the invention will become further apparent from the following detailed description of the presently preferred embodiment, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1:
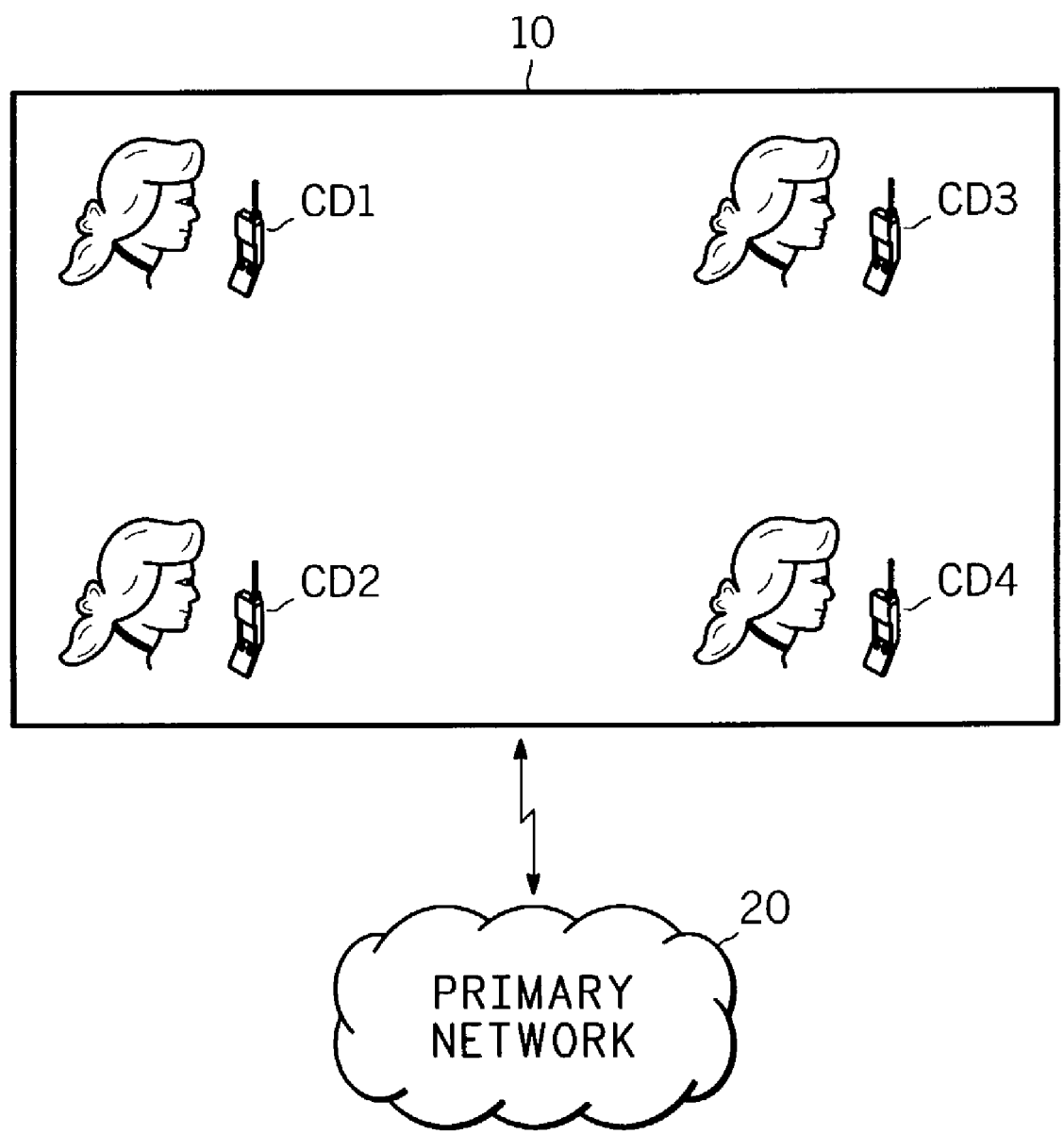
FIG. 1 illustrates an exemplary ad hoc network in accordance with one embodiment of the present invention.

FIG. 1 illustrates an exemplary ad hoc network 10 including four (4) cellular devices CD1-CD4 within a coverage area of the ad hoc network 10. The cellular device CD1 corresponds to an exclusive phone number (e.g., XXX-XXX-XXX1). The cellular device CD2 corresponds to an exclusive phone number (e.g., XXX-XXX-XXX2). The cellular device CD3 corresponds to an exclusive phone number (e.g., XXX-XXX-XXX3). The cellular device CD4 corresponds to an exclusive phone number (e.g., XXX-XXX-XXX4). The coverage area of the ad hoc network 10 is dependent upon an employment of a communication protocol between the cellular devices CD1-CD4 (e.g., Bluetooth, 802.11, and cordless telephone protocols utilized in 900 MHz cordless telephones manufactured by AT&T and Panasonic). For purposes of the facilitating an understanding of the remaining descriptions. Bluetooth will be assumed to provide the communication protocol between cellular devices CD1-CD4.

Figure 2:
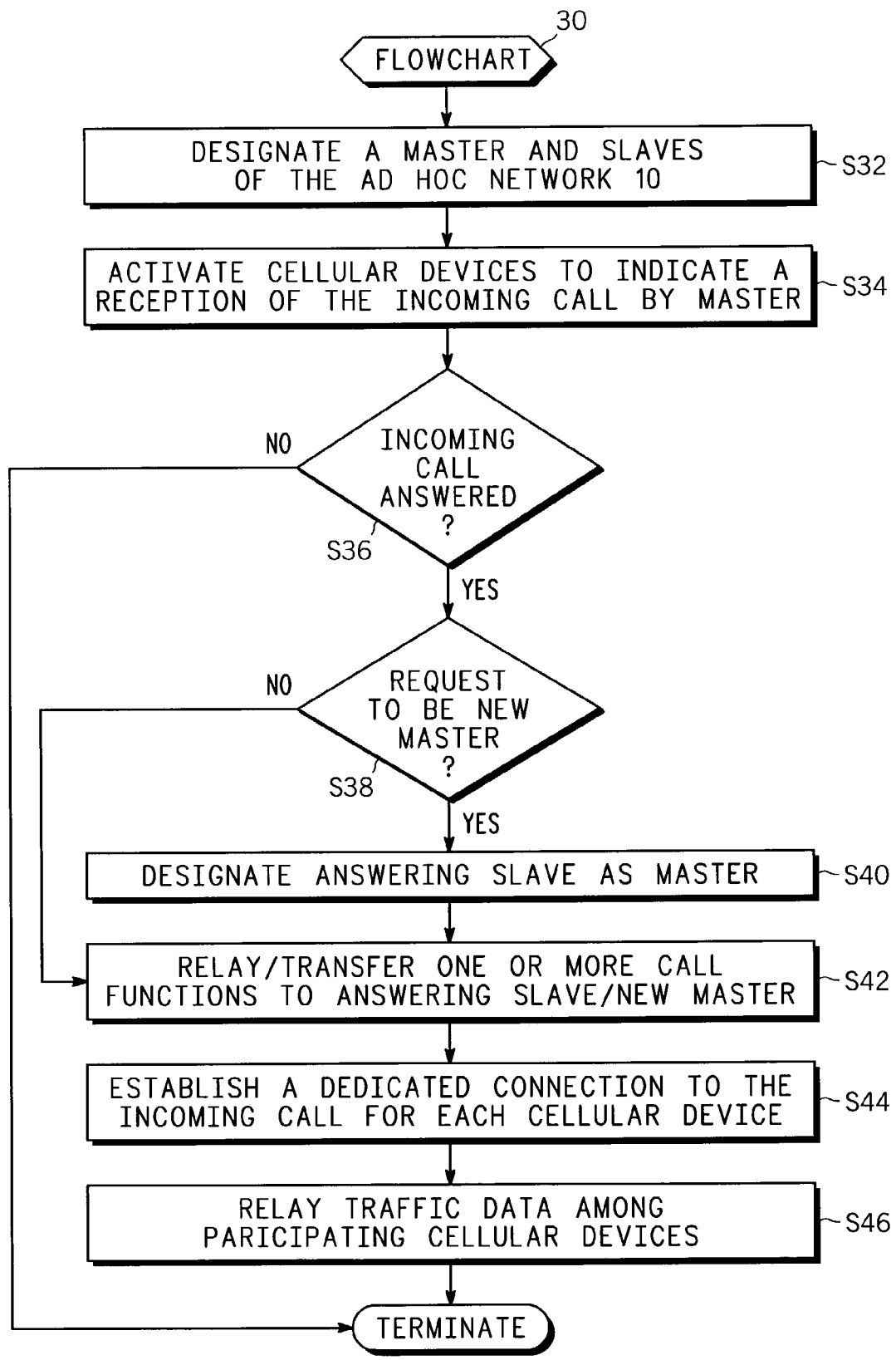
FIG. 2 illustrates a flowchart representative of an incoming call/multi-party connection management method in accordance with one embodiment of the present invention.

The ad hoc network 10 is established upon a communication by a primary network 20 (e.g., a wide area network or a local area network) of an incoming call directed to one of the cellular devices CD1-CD4 or an outgoing call placed by one of the cellular devices CD1-CD4. Upon such a communication, the ad hoc network 10 implements an appropriate call management method of the present invention. FIG. 2 illustrates a flowchart 30 representative of an incoming call/multi-party connection method of the present invention. An implementation of the flowchart 20 facilitates an employment of the ad hoc network 10 as having multiple phone extensions for receiving an incoming call.

During a stage S32 of the flowchart 30, one of the cellular devices CD1-CD4 is designated as a master of the ad hoc network 10 and the remaining cellular devices among the cellular devices CD1-CD4 are designated as slaves of the ad hoc network 10 in response to an incoming call from the primary network 20. The incoming call is directed to either a cellular device among the cellular devices CD1-CD4 corresponding to phone number associated with the incoming call or a cellular device among the cellular devices CD1-CD4 that receives all incoming calls from the primary network 20 irrespective of the phone number associated with the incoming call. In one embodiment of the stage S32, the cellular device among the cellular devices CD1-CD4 receiving the incoming call from the primary network 20 is designated as the master and the remaining cellular devices the remaining cellular devices among the cellular devices CD1-CD4 are designated as slaves of the ad hoc network 10. For purposes of the facilitating an understanding of the remaining description of the flowchart 30, the remaining stages of the flowchart 30 will be described as whereby the cellular device CD1 was designated as master and the cellular devices CD2-CD4 were designated as slaves during the stage S32.

During a stage S34 of the flowchart 30, the cellular devices CD1-CD4 are activated to indicate a reception of the incoming call by the master cellular device CD1. In one embodiment of the stage S34, an activation of each cellular device among the cellular devices CD1-CD4 that is powered on an in a passive state (i.e., not engaged in a call) is in the form of a ring by such cellular device(s), and an activation of each cellular device among the cellular devices CD1-CD4 that is powered on and in an active state (i.e., not engaged in a call) is in the form of a call waiting tone by such cellular device(s).

During a stage S36 of the flowchart 30, the master cellular device CD1 determines if the incoming call was answered by a cellular device among the cellular devices CD1-CD4. The act of determining by the master cellular device CD1 can involve a reception of a message or a command from among the slave cellular devices CD2-CD4 intended to inform the master cellular device CD1 that the incoming call has been answered by one of the slave devices CD2-CD4. The master cellular device CD1 proceeds to terminate the flowchart 30 if the incoming call was not answered prior to being released or further processed (i.e., directed to a voice mail service provider) by the primary network 20. Otherwise, the master cellular device CD1 proceeds to a stage S38 of the flowchart 30 to determine if the master cellular device CD1 has received a request from one of the slave cellular devices CD2-CD4 to be a new master.

Figure 3:
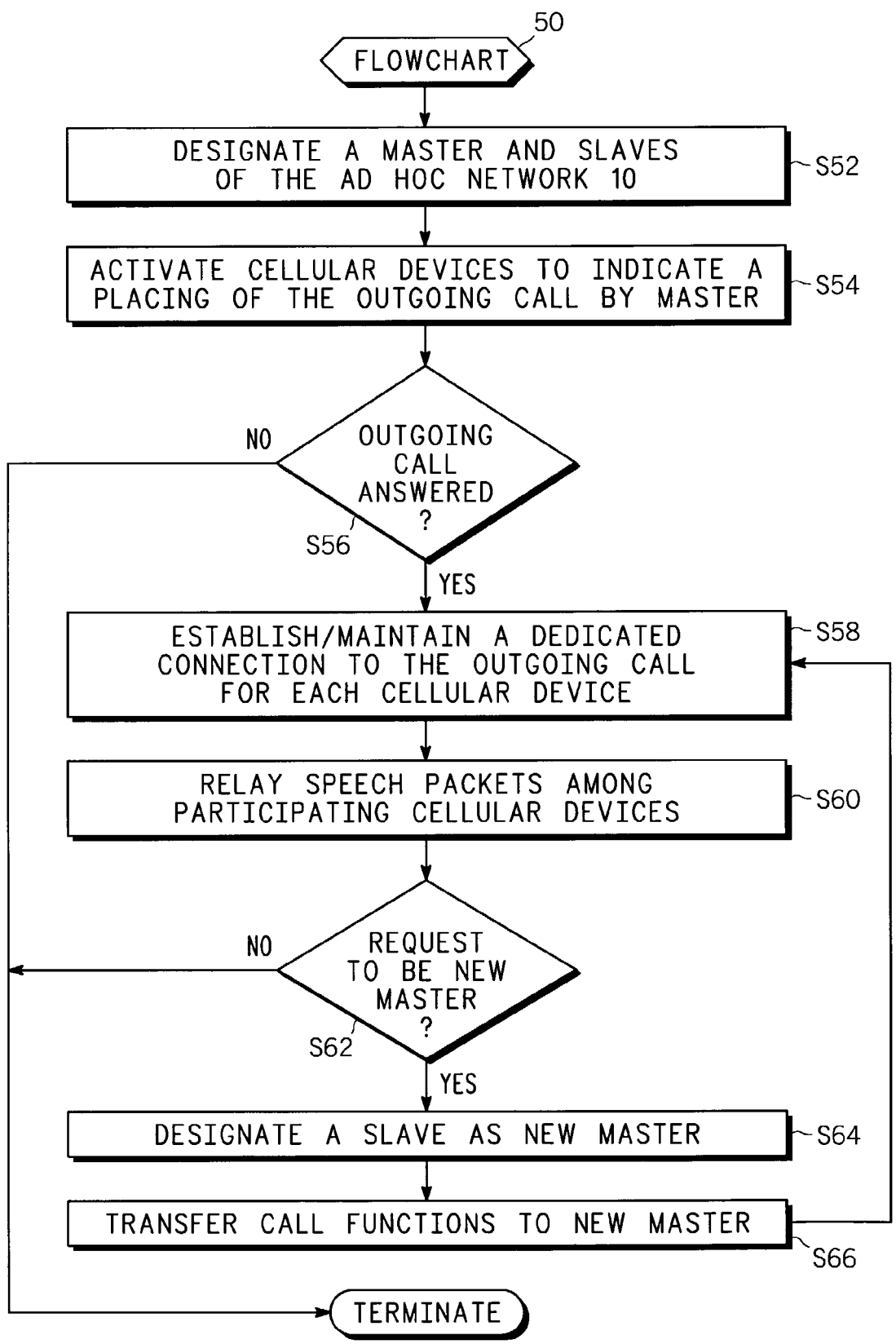
FIG. 3 illustrates a flowchart representative of an outgoing call/multi-party connection management method in accordance with one embodiment of the present invention.

A first scenario involves an answering of the incoming call by the master cellular device CD1 or by one of the slave cellular devices CD2-CD4 that does not indicate a desire to become designated as the master of the ad hoc network 10. In the first scenario, the master cellular device CD1 proceeds to implement a trio of stages S42-S46 of the flowchart 40 in the sequence as illustrated in FIG. 3 2 or in any other sequence within the spirit of the present invention. During the stage S42, the master cellular device CD1 relays one or more call control functions to an answering slave, if any, among the slave cellular devices CD2-CD4. In one embodiment, the master cellular device CD1 relays all call control functions (e.g., call waiting, 3-way calling) to the answering slave except of the release call control function. For purposes of the facilitating an understanding of the remaining description of the flowchart 30, the remaining stages of the flowchart 30 under the first scenario will be described the cellular devices as if CD2 is the answering slave.

During the stage S44, the master cellular device CD1 establishes a dedicated connection to the incoming call for the slave cellular devices CD2-CD4 whereby the users of these cellular devices can selectively participate in the phone conversation. A dedicated connection includes a Bluetooth link for signaling and traffic between the master cellular device CD1 and any of the slave cellular devices CD2-CD4 that choose to participate in the conversation. During the stage S46, a copy of the traffic data from the incoming calling party (e.g. speech packets) intended for delivery to the master cellular device CD1 relays speech packets is relayed among each cellular device in the ad hoc network 10 participating in the phone conversation. The master cellular device CD1 conventionally relays traffic data (e.g. speech packets) from each cellular device CD2-CD4 in the ad hoc network participating in the phone conversation to the calling party in the primary network.

A second scenario involves an answering of the incoming call by one of the slave cellular devices CD2-CD4 that indicates a desire to become designated as the master of the ad hoc network 10, or a solicited desire to become designated as the master of the ad hoc network 10 upon an indication by the master cellular device CD1 to be released from the multi-party connection. In the second scenario, the master cellular device CD1 proceeds to implement four (4) stages S40-S46 of the flowchart 30 in the sequence as illustrated in FIG. 3 2 or in any other sequence within the spirit of the present invention. For purposes of the facilitating an understanding of the remaining description of the flowchart 30, the remaining stages of the flowchart 30 under the second scenario will be described as if the cellular device CD2 is the answering slave.

During the stage S40, the answering slave CD2 is designated a new master of the ad hoc network 10. In one embodiment, the cellular device CD1 receives a master designation request from the answering slave CD2 to become the new master. During the stage S42, the cellular device CD1 transfers all call control functions to the new master cellular device CD2. In one embodiment, the cellular device CD1 negotiates such a transfer with the primary network 20. This can be accomplished through procedures implemented by anyone skilled in the art such as initially setting up a 3-party conference between the cellular devices CD1 and CD2, and the calling party in the primary network 20, and subsequently releasing the cellular device CD1 from the conference that results in a call transfer to the cellular device CD2. Alternatively, a call transfer can be accomplished with the use of Signaling System #7 as defined by the CCITT Q.700 series specifications for call transfer between the cellular devices CD1 and CD2. In either case, the end result is the same. The primary network 20 will move the connection between the calling party and the cellular device CD1 to a connection between the calling party and the cellular device CD2 while removing the cellular device CD1 from a busy state to make it capable of receiving new calls and putting the cellular device CD2 into a busy state to prevent it from receiving new calls, except with the use of call waiting.

During the stage S44, the new master CD2 establishes a dedicated connection to the incoming call for the slave cellular devices CD1, CD3 and CD4 whereby the users of these cellular devices can selectively participate in the phone conversation. Such a dedicated connection includes a Bluetooth link for signaling and traffic between the new master cellular device CD2 and any of the cellular devices CD1, CD3 and CD4 that choose to participate in the conversation. During the stage S46, a copy of the traffic data from the incoming calling party (e.g. speech packets) intended for delivery to the new master CD2 relays speech packets is relayed among each cellular devices in the ad hoc network 10 participating in the phone conversation. The master cellular device CD2 relays traffic data (e.g. speech packets) from each cellular device CD1, CD3, and CD4 in the ad hoc network 10 participating in the phone conversation to the calling party in the primary network 20.

From the preceding description of the flowchart 30 illustrated in FIG. 2, those having ordinary skill in the art will appreciate various benefits of the present invention. One major benefit is a cooperative ad hoc network of phone extensions that provides a dedication connection to an incoming call to a non-answering cellular device to thereby allow the non-answering cellular device to join a phone conversation at any time whereby a multi-party single line connection is established. Once a multi-party connection is established, a second major benefit of the present invention is an opportunity for a participating cellular device to release from the dedicated connection to the incoming call and to thereafter either receive a new incoming call from the primary network or to place a new outgoing call whereby the ad hoc network has the flexibility to support both single and multiple line connections with the primary network.

FIG. 3 illustrates a flowchart 50 representative of an outgoing call/multi-party connection method of the present invention. An implementation of the flowchart 50 facilitates an employment of the ad hoc network 10 as having multiple phone extensions for participating in a conversation associated with an outgoing call.

During a stage S52 of the flowchart 50, one of the cellular devices CD1-CD4 is designated as a master of the ad hoc network 10 and the remaining cellular devices among the cellular devices CD1-CD4 are designated as slaves of the ad hoc network 10 in response to an outgoing call from one of the cellular devices CD1-CD4. The outgoing call is communicated to the primary network 20 by either a cellular device among the cellular devices CD1-CD4 utilized to place the outgoing call or a cellular device among the cellular devices CD1-CD4 that places all outgoing calls from the primary network 20 irrespective of the cellular device associated placing the outgoing call. In one embodiment of the stage S52, the cellular device among the cellular devices CD1-CD4 placing the outgoing call to the primary network 20 is designated as the master. The remaining cellular devices among the cellular devices CD1-CD4 are designated as slaves of the ad hoc network 10. For purposes of the facilitating an understanding of the remaining description of the flowchart 30, the remaining stages of the flowchart 30 will be described whereby the cellular device CD1 was designated as master and the cellular devices CD2-CD4 were designated as slaves during the stage S52.

During a stage S54 of the flowchart 50, the cellular devices CD1-CD4 are activated to indicate a placement of the outgoing call by the master cellular device CD1. In one embodiment of the stage S54, an activation of each cellular device among the cellular devices CD1-CD4 that is powered on and in a passive state (i.e, not engaged in a call) is in the form of a displayed message by such cellular device(s), and an activation of each cellular device among the cellular devices CD1-CD4 that is powered on and in a active state (i.e., engaged in a call) is in the form of a unique tone by such cellular device(s).

During a stage S56 of the flowchart 50, the master cellular device CD1 determines if the outgoing call was answered by an intended party. The master cellular device CD1 proceeds to terminate the flowchart 50 if the outgoing call was not answered prior to being released by the primary network 20. Otherwise, the master cellular device CD1 proceeds to a stage S58 of the flowchart 50 to establish a dedicated connection to the outgoing call for the slave cellular devices CD2-CD4 whereby the users of these cellular devices can selectively participate in the phone conversation. A dedicated connection includes a Bluetooth link for signaling and traffic between the master cellular device CD1 and any of the slave cellular devices CD2-CD4 that choose to participate in the conversation. During the stage S60 of the flowchart 50, a copy of the traffic data from the outgoing called party (e.g., speech packets) intended for delivery to the master cellular device CD1 is relayed among each cellular device in the ad hoc network 10 participating in the phone conversation. The master cellular device CD1 conventionally relays traffic data (e.g. speech packets) from each slave cellular device CD2-CD4 in the ad hoc network participating in the phone conversation to the called party in the primary network 20.

The master cellular device CD1 implements the stage S60 until the master cellular device CD1 indicates he or she desires to release the outgoing call while one or more slave cellular devices CD2-CD4 are participating in the outgoing call. In response to such an indication, the master cellular device CD1 determines if any of the participating slave cellular device CD2-CD4 wish to become the new master of the ad hoc network 10 during a stage S62 of the flowchart 50. If not, then the outgoing call is terminated by a termination of the flowchart 50. Otherwise, during a stage S64 of the flowchart 50, one of the slave cellular device CD2-CD4 (e.g., the cellular device CD2) is designated as a new master of the ad hoc network 10. During a stage S66 of the flowchart 50, the cellular device CD1 transfers all call control functions to the new master cellular device CD2. In one embodiment, the cellular device CD1 negotiates such a transfer with the primary network 20. This can be accomplished through procedures implemented by anyone skilled in the art such as initially setting up a 3-party conference between the cellular devices CD1 and CD2, and the called party in the primary network 20, and subsequently releasing the cellular device CD1 from the conference that results in a call transfer to the cellular device CD2. Alternatively, a call transfer can be accomplished with the use of Signaling System #7 as defined by the CCITT Q.700 series specifications for call transfer between the cellular devices CD1 and CD2. In either case, the end result is the same. The primary network 20 will move the connection between the called party and the cellular device CD1 to a connection between the called party and the cellular device CD2 while removing the cellular device CD1 from a busy state to make it capable of receiving new calls and putting the cellular device CD2 into a busy state to prevent it from receiving new calls, except with the use of call waiting.

Upon completion of the stage S66, the new master cellular device CD2 implements the stages S58-S62 as previously described herein in connection with the cellular device CD1 serving as the master of the ad hoc network 10.

From the preceding description of the flowchart 50 illustrated in FIG. 3, those having ordinary skill in the art will appreciate various benefits of the outgoing call/multi-party connection method of the present invention. One major benefit is a cooperative ad hoc network of phone extensions that provides a dedication connection to an outgoing call to each cellular device to thereby allow each cellular device to join a phone conversation at any time whereby a multi-party single line connection is established. Once a multi-party connection is established, a second major benefit is an opportunity for a participating cellular device to release from the dedicated connection to the outgoing call and to thereafter either receive a new incoming call from the primary network or to place a new outgoing call whereby the ad hoc network has the flexibility to support both single and multiple line connections with the primary network.

Figure 4:
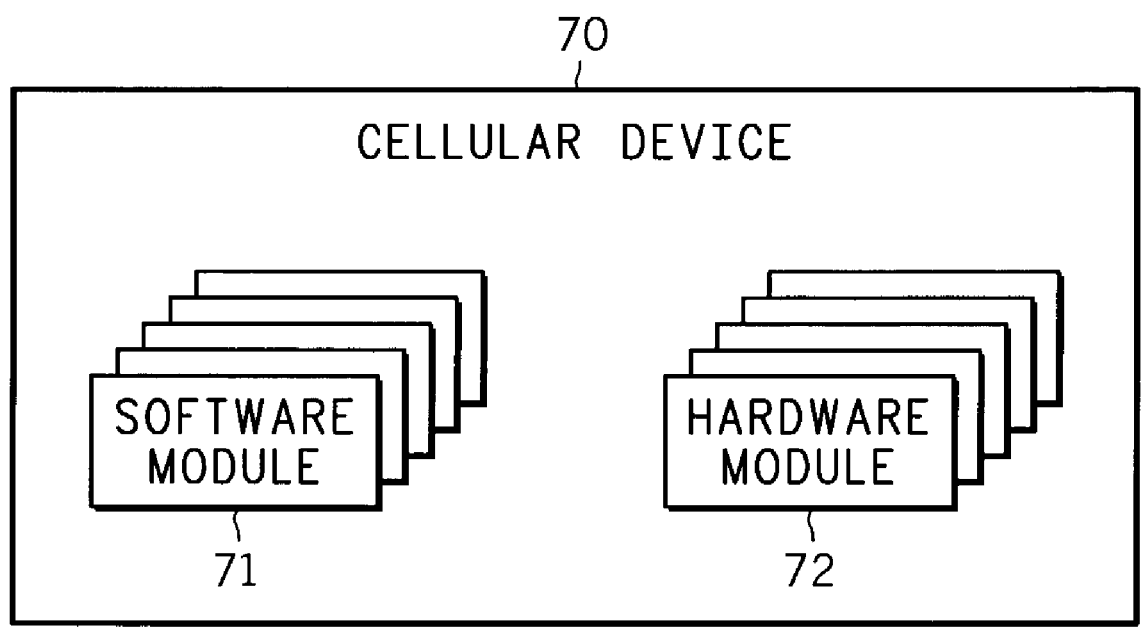
FIG. 4 illustrates one embodiment of a cellular device in accordance with the present invention.

FIG. 4 illustrates a wireless device 70. In addition to conventional ad hoc networking technology (e.g., Bluetooth), a cellular device 70 employing the present invention (further includes one or more software modules 71, one or more hardware modules 72, and/or a combination thereof with each module being designed as would be appreciated by those having ordinary skill in the art to implement one or more stages of the illustrated flowcharts of FIGS. 2 and 3, or alternative embodiments thereof within the spirit of the present invention.

The ad hoc network 10 (FIG. 1) was illustrated for purposes of describing an incoming call and outgoing call management methods of the present invention. The number of ad hoc network configurations employing the present invention is essentially limitless as will be appreciated by those having ordinary skill in the art.

The terms "master", and "slave" have established definitions within the preferred Bluetooth protocol. For purposes of the present invention, those established definitions are inclusive of the established definitions of counterpart terms within other protocols that may be utilized in an implementation of the present invention.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

I claim:

1. A method of establishing and operating an ad hoc network including a plurality of cellular devices, said method comprising:

receiving an incoming call at a first cellular device of the plurality of cellular devices in a radio signal transmitted by a cellular network transmitter;

activating a second cellular device of the plurality of cellular devices to indicate the reception of the incoming call by use of a dedicated connection between the first cellular device and the second cellular device, wherein all other cellular devices of the plurality of cellular devices are also activated at substantially the same time to indicate the reception of the incoming call;

receiving a request at the first cellular device by use of the dedicated connection from the second cellular device that the second cellular device be an answerer of the incoming call;

establishing a connection to the incoming call by the first cellular device after the receipt of the request that the second cellular device be an answerer of the incoming call; and making the second cellular device an answerer of the incoming call by relaying speech packets intended for the first cellular device to the second cellular device, relaying speech packets from the second cellular device to the incoming call and relaying call control functions intended for the first cellular device to the second cellular device, wherein the relaying is performed by the first cellular device.

2. The method according to claim 1, wherein activating the second cellular device of the incoming call is performed by generating a ring tone.

3. The method according to claim 1, wherein the dedicated connection is a Bluetooth® connection.

4. The method according to claim 1, wherein the second cellular device is capable of receiving new cellular calls in a radio signal transmitted by a transmitter of the cellular network before, during, and after the connection is established.

5. A method of establishing and operating an ad hoc network including a plurality of cellular devices, said method comprising:

receiving an incoming call at a first cellular device of the plurality of cellular devices in a radio signal transmitted by a cellular network transmitter;

activating a second cellular device of the plurality of cellular devices to indicate the reception of the incoming call by use of a dedicated connection between the first cellular device and the second cellular device, wherein all other cellular devices of the plurality of cellular devices are also activated at substantially the same time to indicate the reception of the incoming call;

establishing a connection to the incoming call and answering the incoming call by the first cellular device after activating the second cellular device to indicate the reception of the incoming call;

receiving a request at the first cellular device by user of the dedicated connection from the second cellular device that a multiparty call be formed for the incoming call that includes the first cellular device; and forming the multiparty call by routing speech packets between the first cellular device and the second cellular device using the dedicated connection.

6. The method according to claim 5, wherein activating the second cellular device of the incoming call is performed by generating a ring tone.

7. The method according to claim 5, wherein the dedicated connection is a Bluetooth® connection.

8. The method according to claim 5, wherein the second cellular device is capable of receiving new cellular calls in a radio signal transmitted by a transmitter of the cellular network before, during, and after establishing the connection and before, during, and after forming the multiparty call.

* * * * *